V. Himmer,

Lemon Squeezer.

No. 101,128.          Patented Mar. 22, 1870

Witnesses.
C. Wahlers
E. F. Kastenhuber

Inventor.
V. Himmer
By VanSantvoord & Hauff
his attys

United States Patent Office.

VITALIS HIMMER, OF NEW YORK, N. Y.

Letters Patent No. 101,128, dated March 22, 1870.

IMPROVED LEMON-SQUEEZER.

The Schedule referred to in these Letters Patent and making part of the same.

*To all whom it may concern:*

Be it known that I, VITALIS HIMMER, of the city, county, and State of New York, have invented a new and improved Lemon-Squeezer; and I do hereby declare the following to be a full, clear, and exact description thereof, which will enable those skilled in the art to make and use the same, reference being had to the accompanying drawing forming part of this specification, in which drawing—

Similar letters indicate corresponding parts.

This invention relates to articles for obtaining the juices from lemons, oranges, and other fruit; and It consists in an implement having a series of radial blades or arms projected from a common axial line, and terminating with a curve at the end of their axis in such a manner as to produce an egg-shaped figure, joined at one end to a handle, by which it is held, while the end having the blades is pushed into the open end of a divided lemon or other fruit, and turned so as to express the juice therefrom, the lemon being held in one hand and the implement operated with the other.

The letter A designates a series of blades that radiate from a common axis, B, which composes the stock or back of the blades. The blades A are in this example six in number, but I do not confine myself to any particular number.

The extremities of the blades are rounded, and terminate at the center of their axis or stock B, and said blades are beveled off along one side, as indicated at C C, &c., leaving the edge square with one side of the blades, while on the other side it is beveled.

The heels of the blades terminate at the shoulders D D, &c., which serve as stops for the cut edge of the half of the lemon, and which may be connected together, if desired, so as to form a continuous shoulder or ridge around the implement.

Above the shoulders D, I place the handle E, which, in this example, is made of one piece with the blades. They may, however, be made separate, and the blades and stock with the shoulder-part may be of glass, India rubber, or other material, with a socket for a handle of wood or other material.

Figure 1:
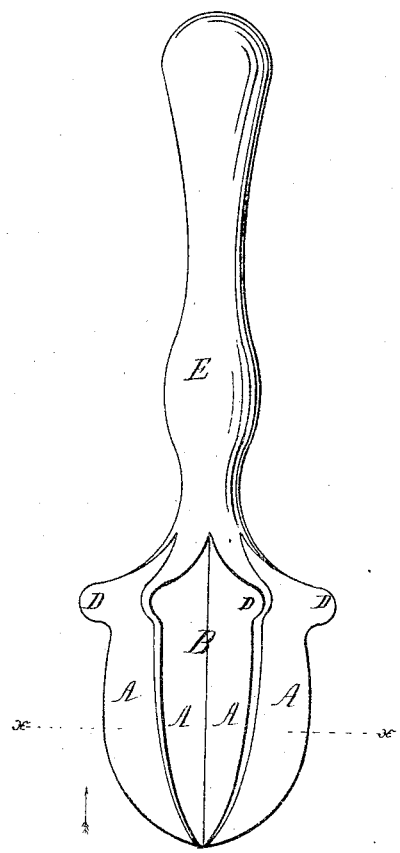
Figure 1 is an elevation of my improvement.
Figure 2:
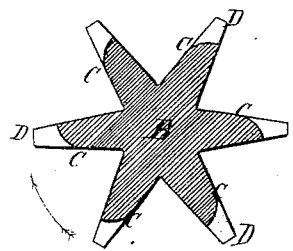
Figure 2 is a cross-section taken in the line $x$–$x$, fig. 1, looking in the direction of the arrow.

In operating this implement the half lemon or orange is held in one hand over a vessel to receive the juice, while the blades are forced into the lemon and turned in the direction of the arrow, fig. 2, so as to tear the pulp and open its cells, and squeeze out the juice contained in them.

What I claim as new, and desire to secure by Letters Patent, is—

The series of blades A, terminating in shoulders D, so as to cut the fruit and to press it apart laterally and vertically, and arranged radially around a central axis or stock B, and joined to an operating-handle, when constructed substantially as herein represented and described.

VITALIS HIMMER.

Witnesses:
W. HAUFF,
E. F. KASTENHUBER.